United States Patent Office 3,384,046
Patented May 21, 1968

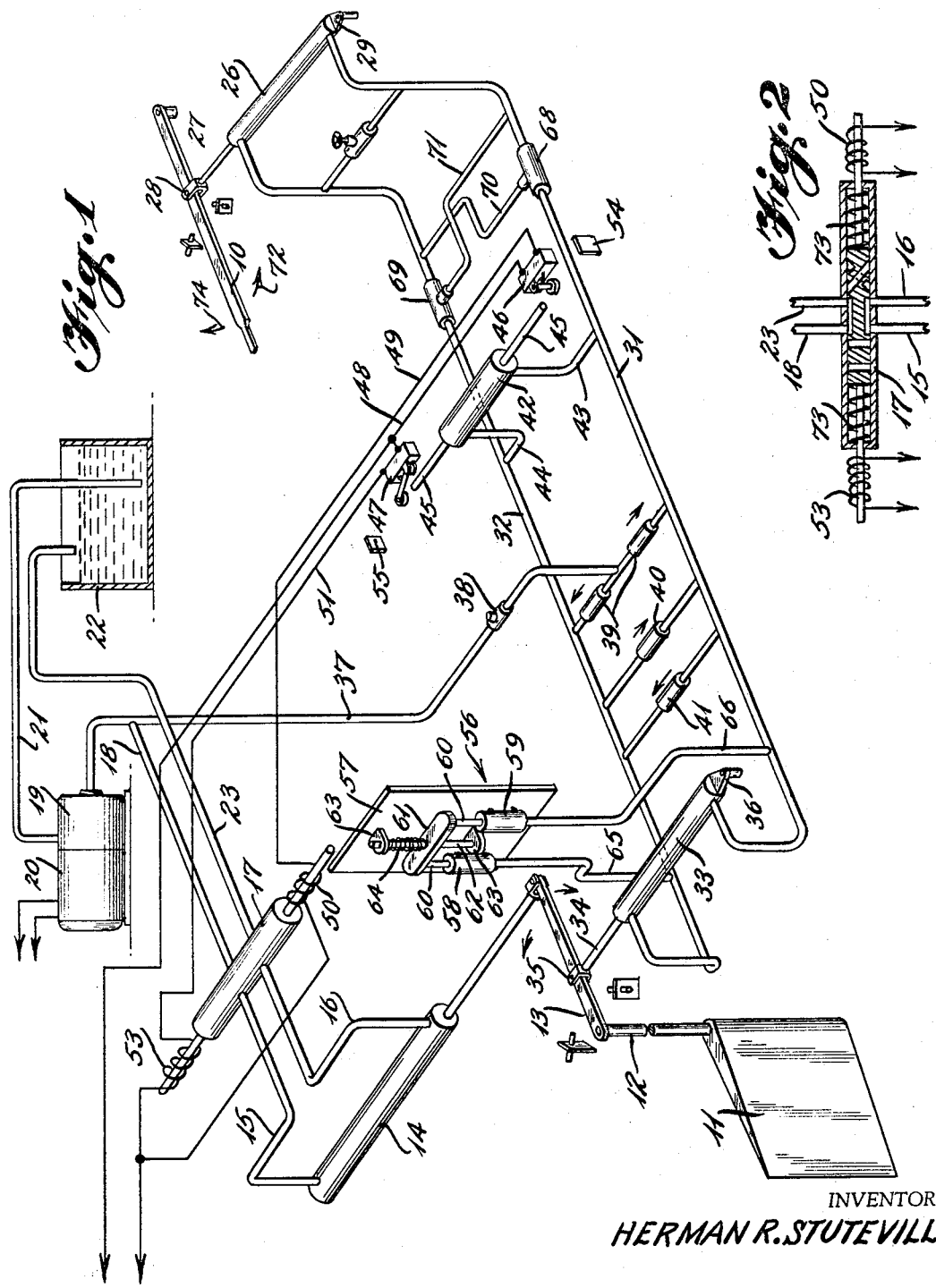

3,384,046
**FLUID ACTUATED FOLLOW-UP STEERING
CONTROL MECHANISM**
Herman R. Stuteville, Nashville, Tenn., assignor to
Nashville Bridge Company, Nashville, Tenn.
Filed Oct. 28, 1966, Ser. No. 590,259
2 Claims. (Cl. 114—150)

ABSTRACT OF THE DISCLOSURE

Apparatus for the steering control mechanism of a vessel in which the steering control mechanism includes a closed normally balanced hydraulic system. The apparatus includes a pressure responsive actuator in the hydraulic system and pressure released check valve means so that one portion of the system can be operated independently of another portion.

---

This invention is an improvement over my co-pending application Ser. No. 485,168, now patent No. 3,302,604 and relates generally to the control and maneuverability of vehicles through water, air or other fluid mediums. The invention relates particularly to a steering control mechanism for a boat or other vehicle by which movement of the helm will be transmitted to the steering mechanism to move the rudder and alter the heading or direction of travel of the vessel.

Heretofore ships and other vessels have been provided with many methods of controlling the rudder to guide the vessel and these have included steering mechanisms of various kinds located adjacent to the rudder and controlled from a remote position such as a pilot house or the like. Most of the prior art devices provided mechanical linkages or cables by which the helm of the vessel was directly connected to the steering mechanism so that movement of the helm would directly energize the steering mechanism and control the position of the rudder. Some efforts have been made to provide a follow-up control by which the steering mechanism was controlled by hydraulic and other fluid means. These prior devices have not been entirely satisfactory since in substantially all of these prior follow-up steering control mechanisms, including my aforesaid co-pending application, it has been necessary that a constant pressure be applied to the helm as long as the steering mechanism was operated.

It is an object of the invention to provide a fluid actuated follow-up steering control mechanism for a vessel having a closed balanced hydraulic system with a fluid operated actuator which is freely movable to a predetermined position in accordance with the movement of the helm of the vessel and which will energize the steering mechanism of the vessel to move the rudder and movement of the rudder will return the system to a balanced condition after the rudder has reached substantially the same predetermined position as the helm.

Another object of the invention is to provide a follow-up steering control mechanism for a vessel having a closed normally balanced hydraulic system with a pressure responsive actuator and pressure released check valve means to permit a first portion of the system to operate independently of another portion when the system is unbalanced and permit the other portion to operate independently of the first portion to return the system to balanced condition.

Other objects and advantages of the invention will be apparent from the following description taken in conjunction with the accompanying drawing in which:

FIG. 1 is a diagrammatic perspective of the steering control mechanism of the present invention, and FIG. 2, a section of the distributor valve of the steering mechanism.

With continued reference to the drawing, a ship or other vessel (not shown) has a helm 10 which may be a lever, steering wheel or other device for controlling the position of a rudder 11 mounted on a stem 12. A tiller 13 is mounted on the upper end of the stem and is connected to a conventional steering mechanism which may use steam, electricity, hydraulic fluid or other source of power as a motivating force.

As illustrated, the tiller 13 is operated by a hydraulic cylinder 14 connected by fluid lines 15 and 16 to a distributor or control valve 17. Such control valve is supplied with hydraulic fluid under pressure through a fluid line 18 from a pump 19 operated by a motor 20 and such pump is connected by a fluid line 21 to a reservoir 22. The control valve 17 is provided with a fluid line 23 for returning fluid to the reservoir 22.

The control mechanism of the present invention includes a fluid cylinder 26 located adjacent to the helm 10 and having a piston rod 27 connected to such helm by a pivot pin 28. The cylinder 26 may be pivotally mounted on a pivot pin 29 carried by the fixed structure of the vessel, or, if desired, the cylinder 26 may be fixed and the piston rod 27 may be connected to the helm 10 by a connecting link (not shown).

The cylinder 26 is connected by fluid lines 31 and 32 to a fluid cylinder 33 located in the steering room of the vessel adjacent to the tiller 13. The cylinder 33 has a piston rod 34 which may be connected by a pivot pin 35 to the tiller, in which case the cylinder 33 is mounted by a pivot pin 36 to the fixed structure of the vessel. If desired, the fluid cylinder 33 may be mounted in fixed position and the piston rod 34 may be connected to the tiller 13 by a connecting link (not shown).

The fluid cylinders 26 and 33 and the fluid lines 31 and 32 form a closed normally balanced system which can be maintained under any desired pressure although a pressure of approximately 10 to 20 p.s.i. has been found satisfactory. To maintain a constant pressure within the system, a fluid line 37 having a pressure reducing valve 38 is connected to the fluid pressure line line 18 and diverts fluid through a pair of one-way check valves 39 to the fluid lines 31 and 32. It will be apparent that the pressure valve 38 is adjustable to reduce the pressure of the fluid in the line 18 to the desired amount.

A pair of one-way relief valves 40 and 41 interconnect the fluid lines 31 and 32 with the valve 40 permitting flow in one direction between the lines and the valve 41 permitting flow in the opposite direction when pressure in the system exceeds a predetermined amount. These valves 40 and 41 prevent an increase in pressure in either line from damaging the system.

An actuator 42 of the double acting fluid cylinder type is provided which is connected by fluid lines 43 and 44 to the lines 31 and 32, respectively. The actuator 42 has a double ended piston rod 45 extending outwardly from both ends in a position to engage micro-switches 46 and 47 located on opposite sides thereof. The micro-switches 46 and 47 are positioned in such a manner that when the actuator 42 is centered and the system is in balance, both micro-switches will be open. When the piston rod 45 is extended in one direction, it will engage and close micro-switch 46 and complete a circuit from a source of electrical energy through electric lines 48 and 49 to a solenoid 50 on the control valve 17 to move such control valve in one direction. When the piston rod 45 is moved in the opposite direction, it will close micro-switch 47 and complete a circuit through electric lines 48 and 51 to a solenoid 53 at the opposite side of the control valve 17 to move the control valve in the other direction. If desired, mechanical stops 54 and 55 may be provided to limit the movement of the piston rod 45 in both directions.

If desired, a pressure volume compensator 56 may be provided to accommodate variations in either pressure or volume within the fluid lines 31 and 32. The compensator 56 includes a base 57 on which a pair of fluid cylinders 58 and 59 are mounted. Each of the cylinders 58 and 59 is provided with a piston rod 60 and the outer end of each of such rods abuts a sliding plate 61.

Such sliding plate is slidably mounted on a shaft 62 carried by brackets 63 on the base 57 and such plate is urged toward the cylinders 58 and 59 by a spring or other resilient means 64 to exert force on the piston rods 60 tending to move the piston rods into the cylinders 58 and 59. The cylinders 58 and 59 are connected by fluid lines 65 and 66, respectively, to the fluid lines 31 and 32. Since the fluid pressure within the cylinders 26 and 33 and the fluid lines 31 and 32 is substantially in balance when the system is at rest, any increase in pressure or volume caused by heat or the like will affect both lines and will cause excess fluid to enter both cylinders 58 and 59 to overcome the tension of the spring 64 and raise the sliding plate 61. When fluid pressure within one of the lines 31 or 32 is increased such pressure will tend to raise one of the piston rods and outward movement of such piston rod will cock or tilt the sliding plate 61 about the shaft 62 and prevent further movement of the piston rod.

A pair of pilot operated pressure released check vales 68 and 69 are provided with the valve 68 being interposed in the line 31 and the valve 69 being interposed in the line 32 between the cylinder 26 and the actuator 42. The check valve 68 is connected by a pilot line 70 to the fluid line 32 and the check valve 69 is connected by a pilot line 71 to the fluid line 31. Normally the check valves 68 and 69 permit fluid to flow from cylinder 26 toward the actuator and prevent flow toward the cylinder 26. However, when the helm is operated the piston within the cylinder 26 will be moved in one direction and will increase the pressure in one of the lines 31 or 32. Such increase in pressure will be transmitted through the pilot line 70 or 71 to the check valve in the opposite fluid line 31 or 32 to open such check valve and permit fluid to flow back into the cylinder 26. As soon as the increased pressure has been relieved, the check valve, which has been opened by pressure in the pilot line, will be closed to prevent further flow of fluid therethrough.

In the operation of the device, when it is desired to turn the vessel to the starboard or right, the handle of the helm 10 is moved toward the right, as indicated by the arrow 72, which will move the piston rod 27 within the cylinder 26 to the right. This will increase the pressure within the fluid line 31 and tend to decrease the pressure within the fluid line 32 causing an unbalanced condition. Since the fluid line 31 is connected to the cylinder 33, the increase in pressure will try to move the piston rod 34, but such piston rod is connected to the tiller 13 which in turn is being held by the much larger cylinder 14. Therefore, the piston rod 34 cannot be moved and the increased pressure within the line 31 will be transmitted to the actuator 42 to cause the piston rod 45 to be extended to the left.

Simultaneously pressure will be transmitted through the pilot line 71 to open the check valve 69 and permit fluid to flow from the actuator 42 through the fluid line 44, the fluid line 32, and the check valve 69 back to the cylinder 26. As soon as the helm 10 is moved to a desired position, pressure in the line 31 is relieved and the check valve 69 will close. It is noted that the flow of fluid from the cylinder 26 through the actuator 42 and back to the cylinder 26 is entirely independent of the flow of fluid through the cylinder 33 so that the helm is freely movable to any desired position and the movement of such helm will move the piston rod 45 past one of the micro-switches 46 or 47 while maintaining such micro-switches closed.

The outward movement of the piston rod 45 to the left will close micro-switch 47 which will energize solenoid 53 and direct fluid into the cylinder 14 through the fluid line 16 to retract the piston rod and move the tiller to the left and the rudder to the right to steer the vessel to the right. Movement of the tiller to the left will create an increased pressure in the fluid line 32 and since such fluid cannot bypass the check valve 69 such increase in pressure will be directed into the actuator 42 and move the piston rod 45 toward the right. As the piston rod approaches a neutral position, it will be retracted from engagement with the micro-switch 47 and permit such microswitch to open and interrupt the circuit to the solenoid 53. This will cause the control valve 17 to return to neutral position by self-centering springs 73 (FIG. 2) and stop the flow of fluid to the cylinder 14. When the cylinder 14 stops moving, pressure within the line 32 is relieved and the system again is in balanced condition. Preferably the cylinders 26 and 33 are substantially identical and when the cylinder 26 is moved the cylinder 33 will be moved a corresponding amount so that the position of the helm will indicate the position of the rudder. In other words, when the helm is amidships the rudder likewise is amidships, and when the helm is, for instance, 20° to the right, the rudder likewise will be 20° to the right.

When it is desired to turn the vessel to port or left, the helm 10 is moved to the left as indicated by arrow 74 and the direction of movement of the various elements is reversed.

It will be apparent that a relatively simple fluid actuated follow-up steering control mechanism has been provided in which the helm is substantially freely movable to either side or along the longitudinal axis of the vessel, and the movement of the helm will energize the steering mechanism to move the rudder of the ship, and after the rudder has assumed substantially the same position as the helm relative to the longitudinal axis, the steering mechanism will be de-energized automatically.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. Apparatus for operating the steering mechanism of a vessel having a helm and a rudder from a remote position comprising a first fluid cylinder operatively connected to said helm, a second fluid cylinder operatively connected to said rudder, a pair of fluid lines connecting said first and second cylinders in a closed balanced fluid system, a pressure responsive actuator connected to said pair of fluid lines intermediate said first and second cylinders, means carried by said actuator for selectively operating said steering mechanism, a releasable check valve means disposed along each of said fluid lines intermediate said first cylinder and said actuator, check valve releasing means connecting each of said check valve means with the other of said fluid lines, and said connecting means being located between said check valve means and said first cylinder, whereby an increase in pressure in one of said fluid lines will release the check valve in the other fluid line and permit fluid to flow through said actuator and back to said first cylinder, and operation of said actuator will energize said steering mechanism to cause said second cylinder to be operated and return said actuator to a neutral position.

2. Apparatus for operating the steering mechanism of a vessel having a helm and a rudder comprising a first fluid cylinder means located adjacent to said helm, means operatively connecting said first cylinder means to said helm, a second fluid cylinder means located adjacent to said rudder, means operatively connecting said second cylinder means to said rudder, a pair of fluid lines connecting said first and second cylinder means in a closed normally balanced fluid system, a pressure responsive actuator connected to said pair of fluid lines intermediate said first and second cylinder means, means carried by said actuator for selectively operating said steering mechanism, releasable check valve means located in each of said fluid lines between said first cylinder means and said actuator, and means for selectively releasing said check valve means to permit substantially free movement of fluid through a portion of said system, whereby a portion of said closed normally balanced system can be operated to move said system to unbalanced condition and cause said actuator to energize said steering mechanism and thereafter another portion of said system will be operated to return the system to balanced condition and deactivate said steering mechanism.

References Cited
UNITED STATES PATENTS

| | | | |
|---|---|---|---|
| 2,389,654 | 11/1945 | Van Der Werff | 91—420 |
| 3,302,604 | 2/1967 | Stuteville | 114—150 |

ANDREW H. FARRELL, *Primary Examiner.*